(12) United States Patent
Crawford

(10) Patent No.: US 8,001,756 B2
(45) Date of Patent: Aug. 23, 2011

(54) APPARATUS AND METHOD FOR USE IN HANDLING AN ELONGATE MEMBER

(75) Inventor: Alexander Charles Crawford, Fife (GB)

(73) Assignee: Depp Tek IP Limited, Fife (GB)

( * ) Notice: Subject to any disclaimer, the term of this patent is extended or adjusted under 35 U.S.C. 154(b) by 385 days.

(21) Appl. No.: 12/311,579

(22) PCT Filed: Oct. 4, 2007

(86) PCT No.: PCT/GB2007/003763
§ 371 (c)(1),
(2), (4) Date: Apr. 3, 2009

(87) PCT Pub. No.: WO2008/040976
PCT Pub. Date: Apr. 10, 2008

(65) Prior Publication Data
US 2009/0272780 A1 Nov. 5, 2009

(30) Foreign Application Priority Data

Oct. 7, 2006 (GB) .................................. 0619870.9

(51) Int. Cl.
*D02G 3/22* (2006.01)
(52) U.S. Cl. ............................................................. 57/3
(58) Field of Classification Search ...................... 57/2.3, 57/2.5, 3; 254/266, 278, 284
See application file for complete search history.

(56) References Cited

U.S. PATENT DOCUMENTS

| 3,029,586 | A | * | 4/1962 | Walsh et al. ........................ 57/3 |
| 3,192,697 | A | * | 7/1965 | Carruthers ...................... 57/285 |
| 5,044,826 | A |   | 9/1991 | Forster |
| 6,698,722 | B1 | * | 3/2004 | Crawford ....................... 254/284 |
| 6,752,384 | B2 | * | 6/2004 | Matheson ...................... 254/266 |
| 7,201,365 | B2 | * | 4/2007 | Crawford ....................... 254/284 |
| 2005/0191165 | A1 | * | 9/2005 | Willis et al. .................... 414/803 |

FOREIGN PATENT DOCUMENTS

| GB | 2 178 717 | 2/1987 |
| WO | WO 01/33028 | 5/2001 |

* cited by examiner

*Primary Examiner* — Shaun R Hurley
(74) *Attorney, Agent, or Firm* — Drinker Biddle & Reath LLP

(57) ABSTRACT

Apparatus and a method for handling an elongate member such as a cable between two points has a support line extending between the points, and winch mechanisms and wrapping devices at each of the points, to permit the elongate member to transit between the two points in a wrapped bundle that is supported mechanically against damage and deviation from a controlled path between the points, and to permit the bundle to be unwrapped at the second point for further manipulation of the elongate member. The invention is particularly useful in raising and lowering a load, towing, and also handling service cables, tubes, pipes, hoses or other elongate lines that are connected between two points. A preferred embodiment is described for the subsea deployment of wireline and the deployment of signal and power cables to subsea wells.

20 Claims, 5 Drawing Sheets

APPARATUS AND METHOD FOR USE IN HANDLING AN ELONGATE MEMBER

RELATED APPLICATION

This Application is the U.S. National Phase Application of PCT International Application No PCT/GB2007/003763 filed Oct. 4, 2007.

FIELD OF THE INVENTION

This invention relates to apparatus for use in handling an elongate member such as a cable. The invention is particularly useful in raising and lowering a load, towing, and also handling service cables, hoses or other elongate lines that are connected between two points. The invention is also useful for deploying other elongate members such as tube and pipes. The invention is particularly, but not exclusively, applicable to the subsea deployment of wireline and the deployment of signal and power cables to subsea wells.

DESCRIPTION OF THE RELATED ART

Delivering elongate members like cables, pipes and tubes over large distances to underwater equipment often involves the provision of a specific bundle of cable(s) and/or hose(s) dedicated to each application. For example, pneumatic hoses, hydraulic hoses, power, signal and control conduits may be needed to convey power and instructions to the tools at the seabed or in the well, and to convey data or signals from the tool to the surface, as well as structural members like coiled tubing and drill pipe strings. Below a certain depth, the weight of the suspended cable eventually exceeds the breaking strain of the cable, and for this reason, the deployment of such cables is normally limited to around 600 m. Also, many of the cables used are fragile and cannot withstand the axial or lateral forces exerted upon them by tides and currents that displace them from their intended course. One approach to solving these problems has been to use armoured cable, but this is extremely expensive, difficult to splice and expand if longer or additional cables are needed, and difficult to handle on the surface due to its very high suspended weight.

BRIEF SUMMARY OF THE INVENTION

According to an aspect of the present invention there is provided apparatus for use in handling an elongate member, the apparatus comprising
  a support line extending between first and second points;
  a first winch mechanism at the first point for paying out and recovering the support line;
  a first wrapping device at the first point for rotating one of the elongate member and the support line around the other as they are payed out to wrap the two together, and to unwrap them from one another as they are recovered;
  a second winch mechanism at the second point, for recovering and paying out the support line;
  a second wrapping device at the second point for rotating one of the elongate member and the support line around the other to unwrap them from one another as they are recovered, and to wrap them together as they are payed out.

The first point may be directly above the second, but this is not necessary, and the support line can be connected between them at an angle to the vertical. The support line can be connected in a straight line in some embodiments, but this is also not necessary, and the path taken by the support line can be deviated.

The support line is typically adapted to be tensioned between the two points.

More than one elongate member can optionally be deployed on a single trip, by providing a further wrapping device at each point to wrap and unwrap the further elongate member from the wrapped bundle. Unwrapping the bundle at the second point has the advantage (in certain embodiments) that only certain parts of the bundle (for example the elongate member) are then deployed below the second point (e.g. into the borehole of the well).

Optionally, the apparatus can include a mechanism for holding and paying out a securing member, and the securing member can be wrapped around the elongate member and the support line at the first point, and unwrapped from them at the second. The securing member is wound around the wrapped bundle of the elongate member and the support line to hold the two together. The securing member can be planar, in the form of a strip, tape or ribbon, or can have a circular cross-section, for example in the form of a rope. In some embodiments, the securing member is resilient and is advantageously applied to the support line in tension. In some cases, the securing member can be adapted to change its conformation when applied to the support line. For example, in some cases, the securing member can be a resilient rope with a circular cross section and when applied to the bundle of the support member and the elongate member it can alter its cross sectional conformation to adopt a generally flat or planar conformation, e.g. when under tension. In certain embodiments, the securing member can acts as a second support line, and can assist in bearing loads applied to the support line. The securing member can be connected between the first and second points in a manner adapted to bear loads applied to the support line. The securing member can typically be wound around the support member in the opposite direction to the chosen direction of winding by the first wrapping device.

The apparatus can be used to lower parts to the seabed for deployment, so that a single trip is needed to deploy the elongate member and any associated parts of the apparatus needed or desired at the second point.

The term "elongate member" is used herein to denote a flexible elongate member typically used for conveying power or data, such as an electrical cable, a fibre optic cable, or a pneumatic or hydraulic hose. Flat or tubular hoses can be provided to convey methanol or other fluids from the surface to the wellhead. It also encompasses structural members such as tubing like coiled tubing and pipe such as drill pipe strings.

The support line can be a rope such as a steel cable, or in some embodiments, can be a man-made fibre rope, which is better than steel because it can be buoyant. The support line is typically held in tension in a straight line between the first point from which the elongate member is initially deployed, and the second point, at which the elongate member is unwrapped from the support line for deployment at the second point. The first and second points can have anchors adapted to fix the apparatus so that the tension can be applied to the support line and/or the securing member. The support line can be tensioned by the application of a weight, such as during lifting or lowering of parts of the apparatus, or the tension can be applied when the support line has a substantially constant length. In some embodiments, the support line is payed out from a first winch drum at the topside of a well (the first point) and is recovered on a second winch drum located at the wellhead. The two winch drums are typically anchored by a crane or A-frame etc at the surface, and by an anchoring member at the wellhead. In some embodiments, one of the winch drums (e.g. the second winch drum at the wellhead) can be connected to the anchoring member via a tensioning device, which is adapted to keep the tension in the support line within a defined (and usually narrow) range, so that as the support line is being payed out from the surface and recovered at the wellhead, the tension in the moving support line is substantially constant, as is the distance between the two points.

During deployment, the support line, the elongate member and (optionally) the securing member are typically initially separate but are wound or wrapped together at the first point using the first wrapping device, and travel in train as a single wrapped bundle of lines towards the second point, at which they are unwrapped from the train by the second wrapping device. The support line and the securing member are typically unwound from drums at the first (upper) point, and wound back onto other drums at the second (lower) point. The elongate member is typically continuously payed out by the apparatus, until the full desired length is reached, after which it can be recovered by operating the winch devices in reverse, to wind the bundle together at the lower (second) end, and separate and recover the various lines at the upper (first) end.

Wrapping the support line and the elongate member together means that the support member can provide the mechanical support for the bundle during the transition between the first and second points, and the elongate member can be designed without a requirement to withstand high forces. This is especially useful if the support line is put under tension during the transition between the two points, since it can then be set to travel in a straight line (or at least with predictable and minor deviations from a straight line), and can be easily engineered to withstand the forces that tend to make it deviate from that predicted course. This enables the elongate member to be delivered from the first point to the second point with great accuracy and with confidence that any deviations from the straight path between the first and second points will be greatly reduced, and that any such deviations will be resisted not by the elongate member (which might be a fragile cable such as a fibre optic cable) but by the support line which can be e.g. a fibre rope that is specifically adapted to withstand lateral and axial forces (for example tides and currents) tending to deviate it from the straight path. Of course, the wrapped bundle can be purposely tensioned between different intermediate points between the first and second points to adopt a path that is not straight, but is for example, z-shaped or some other shape, but in each case, the lateral deviation of the support line (and thus of the rest of the wrapped bundle) can be resisted by the tension in the support line, and the forces exerted on the bundle by any such deviation can be borne by the support line and not by more fragile elements of the bundle. A further advantage of the present invention is that the angle of delivery of the elongate member to the second point can be accurately maintained, as the support line can be tensioned to provide the whole wrapped bundle with the same angle of incidence with respect to the wellhead or other structure located at the second point. This is extremely useful for the deployment of elongate members such as wireline and coiled tubing, both of which need to enter the wellhead at a predictable angle.

The speed of deployment can be determined by the speed of one or each of the wrapping devices. One of the winch or wrapping devices can be driven and the other can idle or can be used to set the tension in the support line.

The device can be deployed on a rig, or on a vessel, and some embodiments (particularly those deployed on vessels) can have heave compensator mechanisms optionally incorporated into the or each winch drum.

The elongate member can be payed out under gentle or no tension, from a feeder device, which can in certain embodiments comprise a sheave device arranged to feed the elongate member into the apparatus along a central axis.

In some embodiments, the elongate member is wrapped around the axis of the support line, but in other embodiments, the elongate member can be deployed along a central axis and the support line can be wrapped around it. The tension in the support line applied during the transit will tend to straighten out the support line and make the elongate member coil around its axis in a helical formation.

In some embodiments adapted for deploying a lightweight elongate member in the form of a cable, the first wrapping device can comprise a cable drum being arranged for rotation about its own axis that coincides with the central axis of the support line. The cable may be guided by sheaves or pulleys from the drum. Instead of rotating on its axis, the cable drum may be static and may have a winding device rotating around it to pay out the cable. The support line drum may have a central aperture through which the support line passes.

In other embodiments, the cable drum may be rotatably mounted on a structural member so that its axis is not coincident with the axis of the support line, and so that it is moved in a circular path around the axis of the support line as the cable is being paid out or recovered. Sheaves and/or pulleys may again guide the cable as it is being paid out or recovered. The axis of the cable drum in such embodiments can be vertical so that it is parallel to the axis of the support line, or horizontal, so that it is perpendicular to the axis of the support line.

Optionally, the cable drum has an axis which coincides with the axis of the load-bearing support line, the cable drum typically having a central aperture through which the load-bearing support line passes, with the cable passing over a cable sheave which is mounted for movement in a circular path around the axis of the support line.

Optionally, the securing member is stored on a drum that has an axis which coincides with the axis of the load-bearing support line, the securing member drum typically having a central aperture through which the load-bearing rope passes, the securing member passing over a sheave which is mounted for movement in a circular path around the axis of the load-bearing support line.

Optionally, the first and second wrapping devices include respective arms arranged for rotation about the load-bearing support line. Optionally, the arms support spooling gear.

Optionally, the securing member leaves the securing member drum and any associated sheaves radially outward of the elongate member to wind the securing member around the outside of both the elongate member and the load-bearing support line.

Optionally, the securing member has elastic properties. Typically, the securing member is made of neoprene with a nylon reinforcing strip or sheath. The securing member can have a nylon reinforcing strip woven into it to limit the maximum extension of the member, or can be sheathed in nylon. The securing member may be planar, and may incorporate an adhesive to hold the securing member to the rope.

Optionally, the winch mechanisms each have a respective driving motor.

Optionally, more than one elongate member can be deployed at the same time, each typically extending from a respective drum. More than one securing member can be provided. Typically the securing member is wound onto the bundle of the support line and the elongate member in a rotational direction that is opposite to the rotational direction used for the initial winding. Further securing members can be applied in different rotational directions.

Optionally, the cable drum and the securing member drum are both coaxial with the load-bearing support line, one being positioned above the other and the load-bearing support line extending through the centre. Alternatively, one of the cable drum and the securing member drum is coaxial with the load-bearing support line and the other is arranged for movement in a circular path around the rope on a winder mechanism. Alternatively, neither the cable drum nor the securing member drum is coaxial with the load-bearing support line and both are moved in a circular path around the rope on winder mechanisms. In any of these cases, the axes of the cable and securing member drums can be either parallel to or perpendicular to the axis of the support line.

Optionally, the apparatus also includes a guide means for guiding the load-bearing support member. Typically, the guide means comprises at least one roller or sheave. Optionally, more than one roller is provided. Optionally, four rollers are provided around the circumference of the line forming a roller cage which encloses the load-bearing support line.

In a further embodiment, instead of the support line being payed out along a central axis and the elongate member being wound around it, it is often possible for the elongate member to be payed out along the central axis to avoid lateral deviations of the unsupported elongate member, and to wind the support line around the elongate member instead of vice versa. In such embodiments, the elongate member can be paid out from a winch device and fed into a central axis, and the support line can be payed out from a winch drum that is rotated on an arm that moves in a circular path around the axis. The support line can be fed onto a sheave that delivers the support line close to the central axis of the elongate member, and once the tension is applied to the wrapped bundle, the support line can snap taught into a straight line, forcing the elongate member (which is substantially free from any tension) to wind around it instead of vice versa. The pitch of winding can be loose, e.g. 1 turn per 20 m, and so the forces that are applied to the elongate member during the switch between the axial and helical formations are slight and can be easily borne by the more fragile elongate member.

The second winch and wrapping mechanisms at the second point are typically identical to the first winch and wrapping mechanisms, but are operated in reverse and are upside down in relation to the first mechanism. Thus, as the elongate member and the support line are wound together from initially separate elements at the first mechanism located at the surface of the well, the second mechanism at the wellhead is unwinding them into separate elements again, so that the elongate member can be unwound from its protected bundle, and deployed into the well. At the second winding mechanism, the support line and the securing member are typically unwound from the bundle and wound onto storage reels or drums, ready for being wound back onto the bundle when the elongate member is to be recovered.

According to a second aspect of the present invention there is provided a method for use in handling an elongate member between a first and second points that are spaced apart from one other, the method comprising:
 paying out a support line between the two points;
 paying out an elongate member between the two points;
 wrapping one of the support line and the elongate member around the other as they are being paid out from the first point;
 unwrapping the support line and the elongate member from one another as they are recovered at the second point

BRIEF DESCRIPTION OF THE SEVERAL VIEWS OF THE DRAWINGS

Examples of apparatus and a method for use in handling an elongate member in accordance with the invention will now be described with reference to the drawings, in which:—

DETAILED DESCRIPTION OF THE INVENTION

Figure 1:
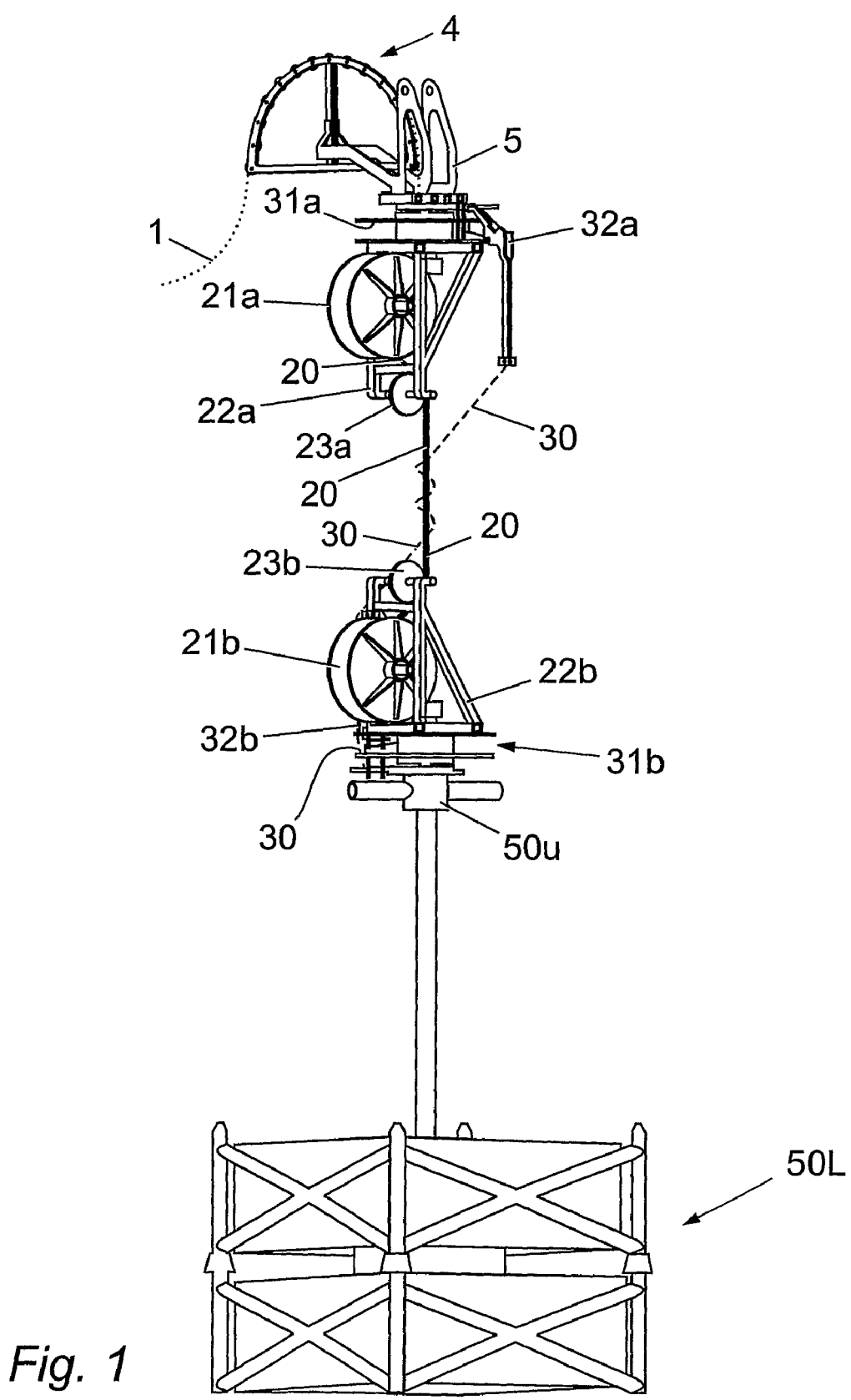
FIG. 1 is a schematic perspective view illustrating a first example of apparatus for handling an elongate member.
Figure 2:
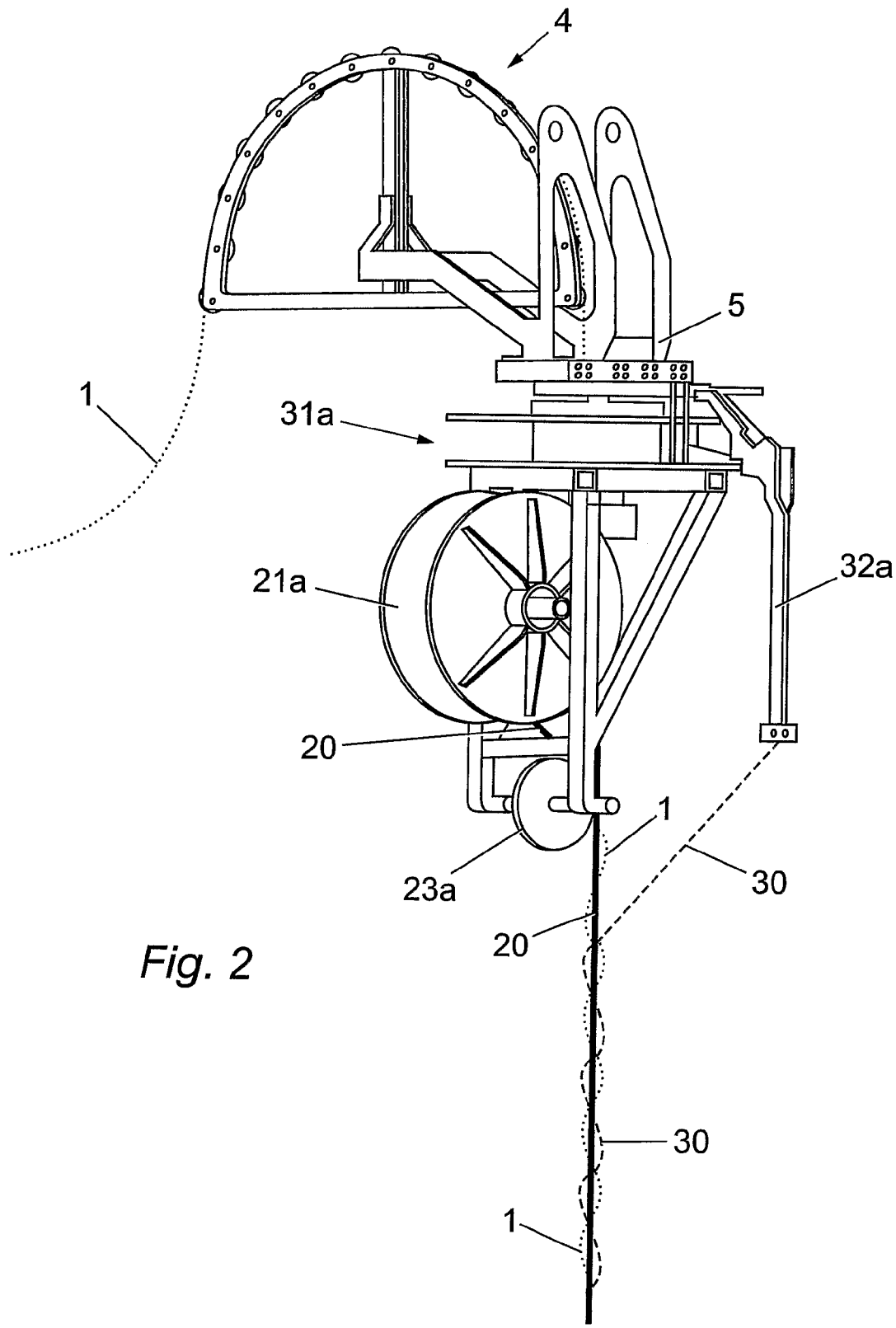
FIGS. 2 and 3 are close up views of a first winding mechanism of the apparatus of FIG. 1.
Figure 3:
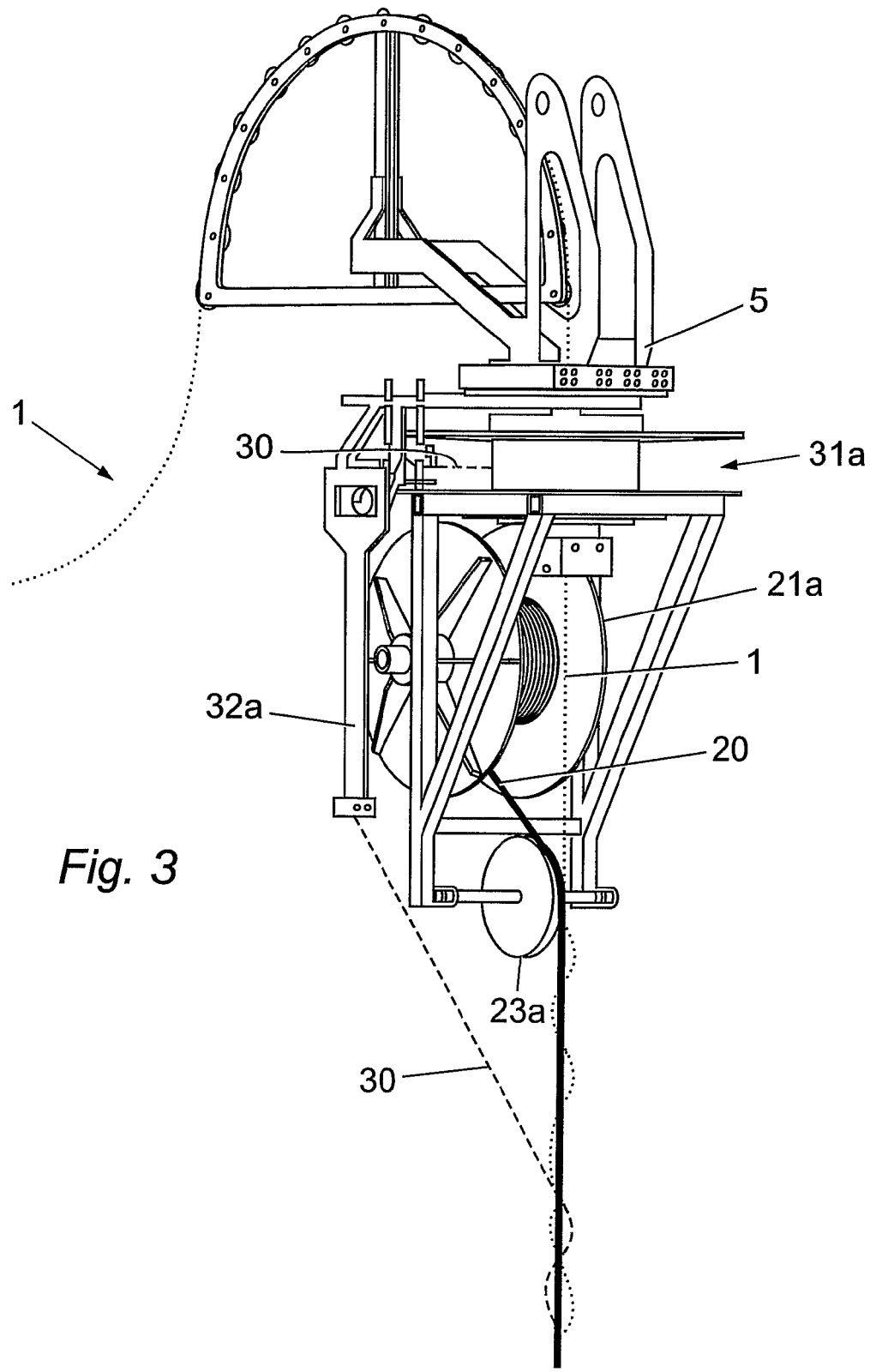
Figure 4:
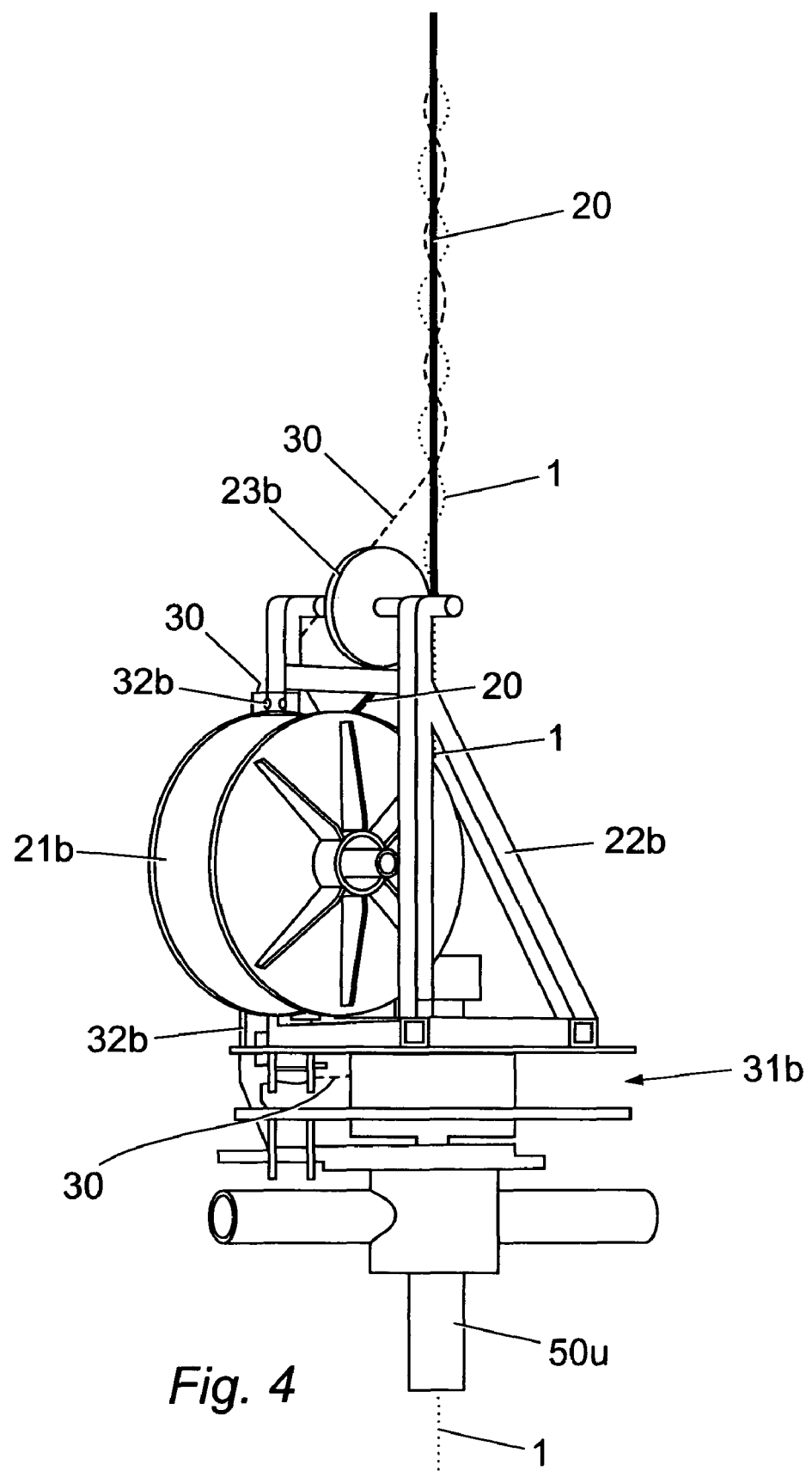
FIG. 4 is a close up view of a second winder mechanism of the apparatus of FIG. 1.

Referring to FIG. 1, a wireline cable handling system is disclosed, for use on a rig or ideally on a wireline support vessel without a requirement for a rig. In wireline operations, a downhole tractor is connected to surface by means of a wire or cable 1, which provides a power conduit for the downhole tractor (not shown) and can carry signals from the tractor, back up to the vessel. The cable may contain several cores for those purposes. The cable must pass through a gland in a lubricator 50 and through a blow-out preventer (BOP) and for those purposes must be relatively narrow. Conventionally, the lubricator 50 has a heavy frame with valves and seals to control the well pressure while permitting the cable to pass through into the well, as well as a housing for the wireline tractor, and it is usually lowered onto the wellhead on guide wires from a dedicated lifting vessel. The wireline operations are then conducted on a separate trip and often using a different vessel.

The apparatus shown in the figures has a first wrapping device and winch mechanism at the surface (at the first point) to wrap the various cables together, and second wrapping device and winch mechanism at the wellhead (the second point) to unwrap them as the wireline cable is inserted into the well.

The wireline service cable 1 typically extends from a service cable storage drum (not shown, but typically located on the deck of the vessel) over a service cable sheave 4 to connect ultimately to the tractor, which is not shown in the drawings, but is located in a housing on the lubricator 50. The sheave 4 is mounted on a frame 5 that carries a first winch mechanism and a first wrapping device, and is located at a first (upper) point on the apparatus. The frame 5 is typically mounted on an A-frame extending over the side or stern of the vessel, or from a moon pool, and can typically be suspended from padeyes or the like at the upper part of the frame 5.

The service cable 1 may be any suitable form of service cable such as flexible steel wire rope or synthetic fibre rope, for example of "Kevlar". The service cable 1 may have several cores of wire to convey power or signals in different directions, fibre optic lines and/or hydraulic or pneumatic conduits etc to convey fluids. The service cable 1 comes off the end of the sheave 4 aligned with a central axis of the apparatus., and has a support line 20 that guides it between a first point at the end of the sheave 4 and a second point at the lubricator 50.

A support line 20 is stored on a first support line drum 21a which is mounted on an L-shaped arm 22a that is rotatably mounted on the frame 5 below the sheave 4, so that the arm 22a rotates around the axis of the cable 1. The L-shaped arm 22a provides a first wrapping mechanism to wrap the support line 20 around the cable 1. Arm 22a has a horizontal limb extending radially from its axis of rotation to a point outward of the axis. It also has a vertical limb extending downwards from the radially outermost end of the horizontal limb, so as to be parallel to the axis of rotation and the cable 1. The support line drum 21a is mounted on the vertical limb, to suspend the support line drum 21a radially outward from the axis. The support line drum 21a is arranged to rotate its own horizontal axis on the vertical limb of the arm 22a, so that as it rotates, the support line 20 comes off the drum 21a onto a sheave 23a mounted on the same arm 22a. The sheave 23a deflects the support line 20 close to the axis of the cable 1, but spaced radially outward from it. The drum 21a is also arranged to move in a circular path around the axis of the cable 1 because it is radially spaced from the cable axis by the rotating arm 22a. The arm 22a is arranged to rotate around the cable 1 as the support line 20 comes off the drum 21a, so that the support line 20 is wound around the cable 1 as each of them is payed out. In this embodiment, the support line drum 21a is driven on its horizontal axis by a hub mounted winch motor (not shown) that together with the drum 21a provides a first winch device for paying out and recovering the support line 20.

A securing member in the form of a planar strip 30 of elastic material such as neoprene is stored on a securing member drum 31a. The drum 31a is mounted on the frame 5 above the arm 22a and the support line drum 21a, and is fixed to the frame 5 on a vertical axis that coincides with the axis of the cable 1, so that it is perpendicular to the support line drum 21a. In some embodiments, the drum 31a is rotatably mounted on the frame and a small amount of torque can optionally be applied to the drum 31a by an electric motor that serves to drive the drum in rotation sufficient to maintain the tension on the securing member 30 as it is wrapped onto the bundle. The securing member drum 31a has a central aperture through which the cable 1 passes on its axis. The drum 31a has a spooling arm 32a, for unwrapping the securing member 30 from the drum 31a and wrapping it onto the wrapped bundle of the support member 20 and the cable 1. The spooling arm 32a has a horizontal and a vertical limb similar to the arm 22a, and is also rotatably mounted for movement in a circular path around the cable 1 in a similar manner. The horizontal limb of the spooling arm 32a is typically longer than that of the arm 22a, so that the vertical limb of the arm 32a is spaced radially outwards from the vertical limb of the arm 22a.

The neoprene strip 30 (or other securing member) extends radially outward from the drum 31a onto a guide loop on the outer end of the horizontal limb of the spooling arm 32a, from where it is guided vertically downward to a further guide loop on the lower end of the vertical limb, after which it leaves the spooling arm 32a at a position radially spaced from the cable 1, and is wound around the entwined support line 20 and cable 1 by the rotation of the spooling arm 32a, typically at a different pitch or in a different direction (at the same or a different pitch) as compared to the support line 20. The arms 22a and 32a are optionally rotatable independently of each other using separate motors, but they could be rotatable together.

Optionally, additional support lines could be wound around the service cable 1 from additional drums rotatably mounted around the service cable 1 in a similar manner to the securing member. Also, additional service cables can be wound onto the wrapped bundle using similar wrapping devices, and in such cases, the securing member 30 should typically be wrapped around the only or outermost line on the bundle.

The strip 30 is optionally elastic, but this is not essential. Certain forms of securing member such as the strip 30 can also be tacky or adhesive.

The support line extends downwards from the winch drum 21a to bear the weight of the lubricator 50 at the lower end of the apparatus. The lubricator has an lower frame 50L to house the tractor and latch onto the wellhead. A gland (not shown) with a valve and seal mechanism is provided in the lower frame to receive the wireline cable 1 and to seal around the outer surface of the cable 1 during insertion of the cable into the well. The cable 1 is typically threaded through the gland and connected to the tractor in the housing before deployment.

The lubricator 50 has an upper frame 50U that bears the second wrapping and winch mechanisms for unravelling the bundle of cables at the wellhead, so that the wireline cable can then be fed through the gland and into the well.

The second wrapping and winch mechanisms are basically similar to the first mechanisms, but are arranged upside down with respect to the first mechanisms. Like parts are herein given the same reference number, except that the first (upper) mechanisms are suffixed "a" and the second (lower) mechanisms are suffixed "b".

The support line 20 extends from the sheave 23a at the first (upper) drum 21a to the second (lower) sheave 23b adjacent the second support line drum 21b. The drum 21b is mounted on a lower frame 22b that is arranged to rotate in the same manner as the upper frame 22a, but in the opposite direction. Likewise, the drum 21b is arranged to rotate on a horizontal axis in the same manner as drum 21a, but in the opposite direction, so that the support line 20 is wound off the wrapped bundle and onto the drum 21b as the drum 21b is rotating around the axis of the cable.

In a like manner, the securing member 30 is wound off the wrapped bundle by a spooling arm 32b onto a securing member drum 31b that is mounted on a vertical axis similar to drum 31a, so that the securing member 30 is unwound from the bundle first, by the upper end of the vertical limb of the spooling arm, above the sheave 23b. Spooling arm 32b rotates in a direction opposite to the arm 32a. The drum 31b can optionally be rotatable and torqued by an electric motor in order to maintain the tension in a similar manner to the drum 31a.

One difference between the first and second winch and wrapping mechanisms, is that the second (lower) winch drum 21b does not need to be driven, although it can optionally be powered by a hub motor in the same way as drum 21a. In some embodiments, the lower drum 21b can be set to rotate at a speed sufficient to maintain tension in the support line 20 so that it stretches taught between the sheaves 23 in a straight line, and bears all of the weight. The speed at which the support line 20 is payed out can be governed by the speed at which the first (upper) drum 21a is driven, and the tension in the line 20 maintained by the setting at the wellhead. Typically the driving gear governing the movement of the lower winch and wrapping mechanisms are linked, so that the various cables are unwrapped at the same speed, although this can be driven from separate motors if needed.

Figure 5:
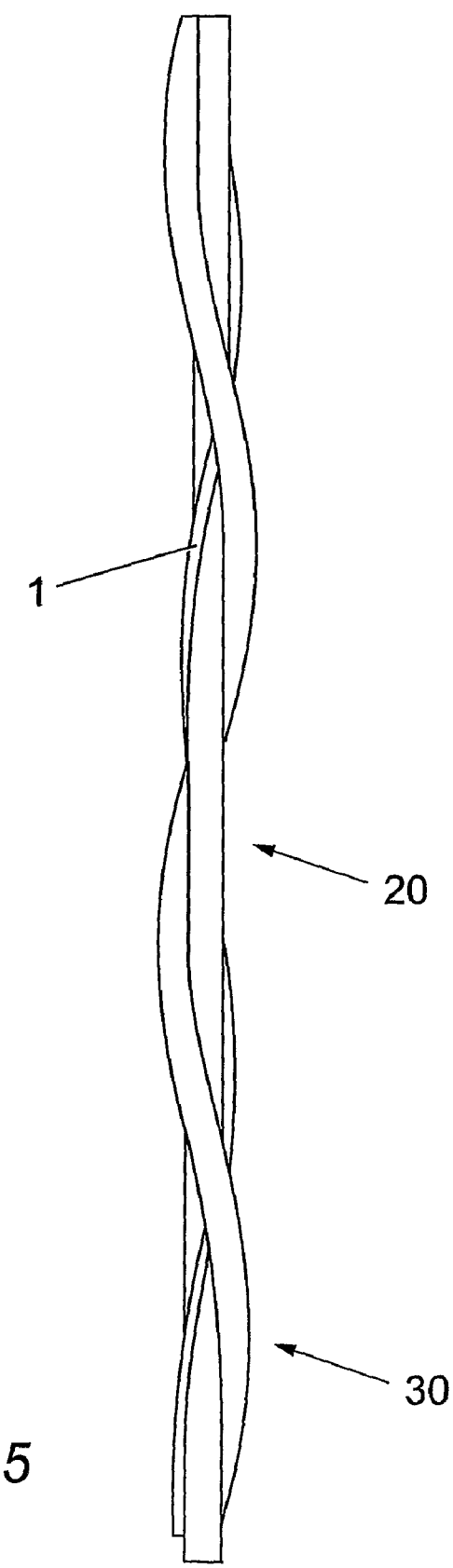
FIG. 5 is a detailed side view of a wrapped bundle of elongate members being deployed in the FIG. 1 apparatus.

Thus the service cable 1 is fed from the sheave 4 along the axis of the cable bundle, the support line 20 and the securing member are wrapped helically around it in the central wrapped bundle, the various lines are payed out together along the axis. When the lubricator is being deployed initially, the cables can be made up in the manner described above, with the service cable 1 connected to the tractor in the housing of the lubricator, and the support line 20 extending between the sheaves 23. The tension in the service cable 1 is typically left slack, so that the load of the lubricator and the parts of the assembly below the frame 5 is all transferred to the support line 20, which stretches out under tension in a straight line between the sheaves 23. Therefore, despite the fact that the service cable 1 is payed out along the central axis of the assembly, the high tension in the support line 20 pulls it into a straight line, and forces the axial cable to adopt a helical configuration around the axis of the tensioned support line 20. The pitch of the helix (initially applied by winding the support line 20 around the axial cable 1) is typically very gentle, so as to avoid damaging the cable 1, and the securing member 30 is then wound on top of the bundle (typically at a different pitch or direction as compared to the support line 20) to resist unravelling, as shown in FIG. 5. One turn per 20 m of the support line is usually an acceptable pitch for each of the cable and the securing member.

In most preferred embodiments the securing member 30 has an elastic component and is applied to the bundle in tension, so that once applied the securing member 30 keeps the cable 1 close to the support line 20. The tension applied to the strip by e.g. a self tensioning device on the wrapping mechanism is not generally sufficient to overcome the tension in the main service cable, and so does not affect the assembly of the support line 20, cable 1 and securing member 30.

Thus the lubricator 50 is lowered from the surface ready for use with the wireline cable being spooled out from the deck and bearing little or no tension. The support line 20, the securing member 30 and the cable 1 can all be payed out at the same speed from the upper wrapping and winch mechanisms, with little or no tension being applied to the cable drum on the deck, so that the service cable is spooled out from the deck drum as the lubricator 50 is lowered toward the wellhead. Also, because the support line 20 is kept in a straight line by the heavy weight of the lubricator 50, the wrapped bundle of cables is resistant to lateral deviation by forces from tides or currents, and the fragile cable 1 is protected from damage during the deployment of the assembly. The service cable 1 is typically held within the wrapped bundle by friction, and the tension applied to the cable 1 at the surface is insufficient to pull the cable from the bundle, so that the cable 1 travels along with the moving support line 20.

Once the lubricator 50 reaches the wellhead, the upper winch mechanisms can be stopped as the lubricator is landed on the wellhead and duly connected. When the lubricator has been connected and integrity tested, the tractor can be released from the housing in the lubricator, and deployed in the well. Up to that point, the end of the service cable 1 has been static with respect to the lubricator 50, and has been deployed to the sea bed at the same speed as the other cables, so the lower winch and wrapping mechanisms are not needed and the lower ends of the support line 20 and the securing member 30 are typically just connected to the drums 21b and 31b without any movement of the drums. Since the tractor will now be moving down through the well from the lubricator at the wellhead, the end of the service cable 1 now needs to move with it relative to the lubricator 50. This is achieved by operation of the lower winch and wrapping mechanisms as follows:

As the tractor travels down the well pulling the cable 1 behind it, the wrapping mechanisms 21, 22 at the upper and the lower ends are operated at the same speed as the movement of the tractor, so that the cable 1 is fed into the wrapped bundle at the surface at the same speed as the tractor, thereby avoiding strain on the cable 1. At the same time, the support line 20 and the securing member 30 are unwrapped from the lower end of the bundle so that the cable 1 can be continuously fed into the gland on the lubricator 50 at a speed that ensures that little or no axial strain is applied to the cable 1 below the lubricator during movement of the tractor. The service cable 1 is thus protected by the wrapped bundle during transit between the sheaves 23, and because of the tension in the support line 20, the cable 1 is fed into the gland at an orientation that is substantially parallel to the conduit through the gland, thereby enhancing the seal, and reducing the risks of damage to the cable 1. When the tractor is finished its excursion, and is reversing direction to travel back to the wellhead, the directions of the wrapping and winch mechanisms are reversed, so that the support line 20 and the securing member are wrapped onto the lower end of the bundle and recovered from the upper end, and the cable 1 is recovered again, with most of the loading during recovery being placed on the support line 20 rather than the more fragile cable 1. If desired, the whole of the lubricator 50 can be recovered in that manner, bearing the weight on the support line 20. If the lubricator 50 is to be recovered by the support line 20, the lower winch and wrapping mechanisms are stopped after the tractor is recovered into the housing on the lubricator, and only the upper winch and wrapping mechanisms are operated to recover the lubricator 50 to the surface.

The motors can be driven at speeds related to the axial speed of the service cable 1. The speed correlation may be fixed. Optionally, however, this correlation will be controllable to alter both the length of twist (pitch) of the lay of the securing member 30 on the service cable 1, and the tension in the securing member 30.

Other modifications may be made within the scope of the invention. For example, the positions of the service cable 1 and the support line 20 could be reversed so that the service cable 1 is on a drum and the support line 2 is fed from a winch on the deck, to wind the service cable 1 around the axial support line 20. When tension is put on the support line 20, it straightens and the service cable 1 becomes wound around the support line in any case.

More support lines, securing member or service cable drums could be provided. In particular, more than one support line can be used to support a heavy umbilical. Further support line drums could be provided rotatably mounted around the service cable 1, or further arms could extend radially outward of the service cable axis, each with a respective cable sheave. Additional hydraulic lines can be provided in the wrapped bundle to provide methanol or other chemicals to the wellhead.

Further rollers and/or guide sheaves could be used to conveniently position the cable relative to the rope, e.g. to deflect one away from the axis of the other, or to pass the cable around the lip of an arm to align the cable with the rope.

The securing member 30 is optionally wrapped around the service cable 1 in the opposite direction to the wrapping of the outer or only support line 20, but this is not essential, and the securing member could be wrapped onto the rope and cable at a different pitch to the cable. Tape could also be wrapped around the entwined cable/ropes, either at intervals or in a long continuous length. To unwind the cable/ropes, the tape may be unwrapped or cut therefrom.

In some embodiments, the initial length of the support line 20 that is payed out to lower the lubricator can have a large diameter and a high capacity for lowering the heavy lubricator into place; the subsequent length of the support line 20 may be tapered to have a lower capacity and a lower breaking strain, as it is only needed to maintain the tension in the line 20 and to support the cable 1; the length of high capacity support line 20 can typically be slightly longer than the depth in which the lubricator 50 will be deployed, so that the lower capacity support line does not come off the upper winch and wrapping mechanisms until the lubricator is landed safely on the wellhead.

The support line 20, the securing member 30 and the cable 1 can all be pre-twisted onto their respective storage drums to avoid axial rotation and kinking when coming off the drums.

In certain embodiments of the invention, the vessel does not need to be directly above the wellhead.

The invention claimed is:

1. Apparatus for use in handling an elongate member, the apparatus comprising
    a support line extending between first and second points;
    a first winch mechanism at the first point for paying out and recovering the support line;
    a first wrapping device at the first point for rotating one of the elongate member and the support line around the other as they are payed out to wrap the two together, and to unwrap them from one another as they are recovered;
    a second winch mechanism at the second point, for recovering and paying out the support line; and
    a second wrapping device at the second point for rotating one of the elongate member and the support line around the other to unwrap them from the one another as they are recovered, and to wrap them together as they are payed out.

2. Apparatus as claimed in claim 1, having a tensioning device to tension the support line between the first and second points.

3. Apparatus as claimed in claim 1, having a further elongate member and a further wrapping device at each of the first and second points to wrap and unwrap the further elongate member from the support member.

4. Apparatus as claimed in claim 1, including at least one securing member and a mechanism for holding and paying out the securing member, whereby the securing member is wrapped around the elongate member and the support line at the first point, and unwrapped from them at the second point.

5. Apparatus as claimed in claim 4, wherein the securing member is selected from the group consisting of a strip, a tape and a ribbon.

6. Apparatus as claimed in claim 4, wherein the securing member is resilient.

7. Apparatus as claimed in claim 6, wherein the apparatus includes a securing member tensioning device to tension the securing member as it is applied to the support line.

8. Apparatus as claimed in claim 7 wherein the securing member has a reinforcing device to limit the maximum extension of the securing member.

9. Apparatus as claimed in claim 4, wherein the securing member has adhesive properties and is held to the elongate member or the support member by adhesive.

10. Apparatus as claimed in claim 4, wherein at least two securing members are wrapped around the elongate member and the support member in different rotational directions.

11. Apparatus as claimed in claim 1, wherein the elongate member is deployed along a central axis and the support line is wrapped around it.

12. Apparatus as claimed in claim 1, having:
    at least two support lines respectively extending between the first and second points;
    respective first winch mechanisms at the first point for paying out and recovering each of the support lines; and
    respective second winch mechanisms at the second point, for recovering and paying out the support lines.

13. Apparatus as claimed in claim 1, wherein the wrapping devices comprise cable drums being arranged for rotation about their own axes which coincide with the central axis of the support line.

14. Apparatus as claimed in claim 1, wherein at least one of the elongate member, the support member and the securing member are guided away from the central axis between the first and second points by guiding devices selected from the group consisting of sheaves and pulleys.

15. Apparatus as claimed in claim 1, wherein at least one of the elongate member, the support member and the securing member are spooled from drums that are rotatably mounted away from the axis of the support line, and which are arranged to move in a circular path around the axis of the support line as the elongate member is being paid out or recovered.

16. A method for use in handling an elongate member between first and second points that are spaced apart from one other, the method comprising:
    paying out a support line between the two points;
    paying out an elongate member between the two points;
    wrapping one of the support line and the elongate member around the other as they are being paid out from the first point;
    unwrapping the support line and the elongate member from one another as they are recovered at the second point.

17. A method as claimed in claim 16 wherein a securing member is wrapped around the elongate member and the support line at the first point, and unwrapped from them at the second.

18. A method as claimed in claim 17, wherein the securing member is wound around the support member in the opposite direction to the chosen direction of winding by the first wrapping device.

19. A method as claimed in claim 16, wherein at least one of the elongate member, the support member and the securing member are payed out under tension.

20. A method as claimed in claim 16, wherein the elongate member is deployed along a central axis and the support line is wrapped around it, whereby tension in the support line applied during the transit will tend to straighten out the support line and make the elongate member coil around its axis in a helical formation.

* * * * *

UNITED STATES PATENT AND TRADEMARK OFFICE
CERTIFICATE OF CORRECTION

| | | |
|---|---|---|
| PATENT NO. | : 8,001,756 B2 | |
| APPLICATION NO. | : 12/311579 | |
| DATED | : August 23, 2011 | |
| INVENTOR(S) | : Alexander Charles Crawford | |

It is certified that error appears in the above-identified patent and that said Letters Patent is hereby corrected as shown below:

Title page of patent, for Item [73] Assignee, change "Depp Tek IP Limited" to
-- Deep Tek IP Limited --.

Signed and Sealed this
Eighteenth Day of October, 2011

David J. Kappos
*Director of the United States Patent and Trademark Office*